(12) United States Patent
Lee et al.

(10) Patent No.: US 8,060,152 B2
(45) Date of Patent: Nov. 15, 2011

(54) APPARATUS AND METHOD FOR CURRENT CONTROL IN MOBILE TERMINAL

(75) Inventors: Ju-Beam Lee, Osan-si (KR); Ho-Joong Kim, Yongin-si (KR); Un-Bong Yang, Seoul (KR)

(73) Assignee: Samsung Electronics Co., Ltd (KR)

( * ) Notice: Subject to any disclaimer, the term of this patent is extended or adjusted under 35 U.S.C. 154(b) by 803 days.

(21) Appl. No.: 11/966,484

(22) Filed: Dec. 28, 2007

(65) Prior Publication Data

US 2008/0161070 A1 Jul. 3, 2008

(30) Foreign Application Priority Data

Dec. 29, 2006 (KR) .......................... 10-2006-0137738

(51) Int. Cl.
*H04M 1/00* (2006.01)
*H04B 1/38* (2006.01)

(52) U.S. Cl. ...................... 455/572; 455/127.1; 455/522

(58) Field of Classification Search ............... 455/127.1, 455/522, 572

See application file for complete search history.

(56) References Cited

U.S. PATENT DOCUMENTS

| | | | |
|---|---|---|---|
| 5,999,829 A | 12/1999 | Chun et al. | |
| 7,155,625 B2 * | 12/2006 | Cohen et al. | 713/340 |
| 2002/0177475 A1 | 11/2002 | Park | |
| 2002/0194517 A1 | 12/2002 | Cohen et al. | |
| 2003/0149904 A1 * | 8/2003 | Kim | 713/330 |
| 2004/0041538 A1 | 3/2004 | Sklovsky | |
| 2004/0204031 A1 * | 10/2004 | Kardach et al. | 455/552.1 |

FOREIGN PATENT DOCUMENTS

| | | |
|---|---|---|
| CN | 1240543 | 1/2000 |
| EP | 1 679 576 | 7/2006 |
| KR | 100266806 | 6/2000 |
| KR | 1020030066050 | 8/2003 |

* cited by examiner

*Primary Examiner* — Tuan H Nguyen
(74) *Attorney, Agent, or Firm* — The Farrell Law Firm. P.C.

(57) ABSTRACT

An apparatus and method for current control in a mobile terminal are provided. The apparatus includes a monitoring unit for measuring a total required current amount that is the sum of current amounts required by respective components of the mobile terminal and detecting whether the total required current amount is greater than a limit threshold value; and a power distribution unit for searching the supply current amounts using a current distribution table when detecting through the monitoring unit that the total required current amount is greater than the limit threshold value, and controlling the power supply unit to supply current to the respective components according to the searched supply current amounts.

14 Claims, 2 Drawing Sheets

APPARATUS AND METHOD FOR CURRENT CONTROL IN MOBILE TERMINAL

PRIORITY

This application claims priority under 35 U.S.C. §119(a) to a Korean Patent Application filed in the Korean Intellectual Property Office on Dec. 29, 2006 and assigned Serial No. 2006-0137738, the contents of which are incorporated herein by reference.

BACKGROUND OF THE INVENTION

1. Field of the Invention

The present invention relates generally to an apparatus and method for current control in a mobile terminal, and in particular, to a current control apparatus and method for supplying current in different amounts according to priority order when a current amount that is greater than a suppliable current capacity is required in a Dual-Band Dual-Mode (DBDM) terminal.

2. Description of the Related Art

Generally, a mobile terminal refers to a device for performing voice communication by communicating with a base station linked with a Public Switched Telephone Network (PSTN) through a specific wireless frequency band allocated to a communication provider. This mobile terminal increasingly expands the coverage thereof as a terminal capable of processing multimedia data by performing a satellite broadcast or terrestrial broadcast listening function, MPEG-1 Audio Layer 3 (MP3) music file reproducing function, and so on, in addition to its original function such as a voice communication function.

Particularly, as Internet usage becomes more popular, research and development in mobile communication technologies for enabling the mobile terminal to receive Internet services are actively being pursued. These Internet services are usually provided by connecting a Code Division Multiple Access (CDMA) mobile terminal to the Internet linked with a base station. Accordingly, connection to the Internet through a base station in a CDMA scheme costs as much as voice communication.

Alternatively, Internet services may be provided through a device, which is mounted on the mobile terminal, capable of communicating with wideband wireless communication networks such as a Wireless Local Area Network (WLAN) and a WiBro network.

A mobile terminal capable of operating in two or more communication modes is referred to as a Dual-Band Dual-Mode (DBDM) terminal. The DBDM terminal can support, for example, CDMA and WLAN communication modes or CDMA and WiBro communication modes.

A DBDM terminal capable of supporting CDMA and WLAN communication modes can provide CDMA communication and WLAN communication simultaneously in a weak electric field area where the CDMA communication requires high current consumption because the WLAN communication requires relatively lower current consumption than the CDMA communication. However, in a DBDM terminal capable of supporting CDMA and WiBro communication modes, when the DBDM terminal provides CDMA communication and WiBro communication simultaneously, WiBro communication requires high current consumption such that a total current amount required by the DBDM terminal can exceed the current capacity of a battery of the DBDM terminal.

In this case, when a communication mode operation starts during another communication mode operation, a total current amount required by a DBDM terminal suddenly increases. In other words, the total current amount is likely to be greater than the current capacity of a battery of a DBDM terminal.

Accordingly, when the total current amount exceeds the current capacity of the battery, one or both of two communication mode operations may be interrupted or the DBDM terminal may shutdown, thereby resulting in reduced battery life and malfunction of the DBDM terminal.

Consequently, there is needed an apparatus and method for solving the above-mentioned problem in a DBDM terminal.

SUMMARY OF THE INVENTION

An aspect of the present invention is to substantially solve at least the above problems and/or disadvantages and to provide at least the advantages below. Accordingly, one aspect of the present invention is to provide an apparatus and method for current control in a mobile terminal.

Another aspect of the present invention is to provide a current control apparatus and method for solving a current supply problem generated when a current amount that is greater than a suppliable current capacity is required in a DBDM terminal.

Still another aspect of the present invention is to provide a current control apparatus and method for supplying a different current amount according to a priority order when a current amount that is greater than a suppliable current capacity is required in a DBDM terminal.

Yet another aspect of the present invention is to provide a current control apparatus and method for temporarily interrupting current supply to a communication unit having a low priority order through a hardware control path and supplying a limited amount of current to the communication unit when a current amount that is greater than a suppliable current capacity is required in a DBDM terminal.

According to one aspect of the present invention, there is provided an apparatus for current control in a mobile terminal. The apparatus includes a first communication unit for providing communication with a first communication network; a second communication unit for providing communication with a second communication network having a lower priority order than that of the first communication network; a power supply unit for supplying current; a monitoring unit for measuring a total required current amount, detecting whether the total required current amount is greater than a limit threshold value, and controlling a current amount to be consumed in the second communication unit to be reduced through a hardware control path when the total required current amount is greater than the limit threshold value; a memory unit for storing a current distribution table with information about supply current amounts for respective components of the mobile terminal, the supply current amounts for the respective components corresponding to the total required current amount; and a power distribution unit for searching the supply current amounts using the current distribution table when detecting through the monitoring unit that the total required current amount is greater than the limit threshold value, and controlling the power supply unit to supply current to the respective components according to the searched supply current amounts.

According to another aspect of the present invention, there is provided an apparatus for current control in a mobile terminal. The apparatus includes a power supply unit for supplying current; a memory unit for storing a current distribution table with information about supply current amounts for respective components of the mobile terminal, the supply current amounts for the respective components corresponding to a total required current amount; a monitoring unit for measuring a total required current amount that is the sum of current amounts required by the respective components of the mobile terminal, and detecting whether the total required current amount is greater than a limit threshold value; and a power distribution unit for searching the supply current amounts using the current distribution table when detecting through the monitoring unit that the total required current amount is greater than the limit threshold value, and controlling the power supply unit to supply current to the respective components according to the searched supply current amounts.

According to still another aspect of the present invention, there is provided a method for current control in a mobile terminal. The method includes measuring a total required current amount that is the sum of current amounts required by respective components of the mobile terminal; detecting whether the total required current amount is greater than a limit threshold value; searching supply current amounts for the respective components corresponding to the total required current amount using a current distribution table when the total required current amount is greater than the limit threshold value; and supplying current to the respective components according to the searched supply current amounts.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for current control in a Dual-Band Dual-Mode (DBDM) terminal in order to solve current supply problem by supplying current in different amounts according to the priority order when a required current amount is greater than a suppliable current capacity of a battery.

Figure 1:
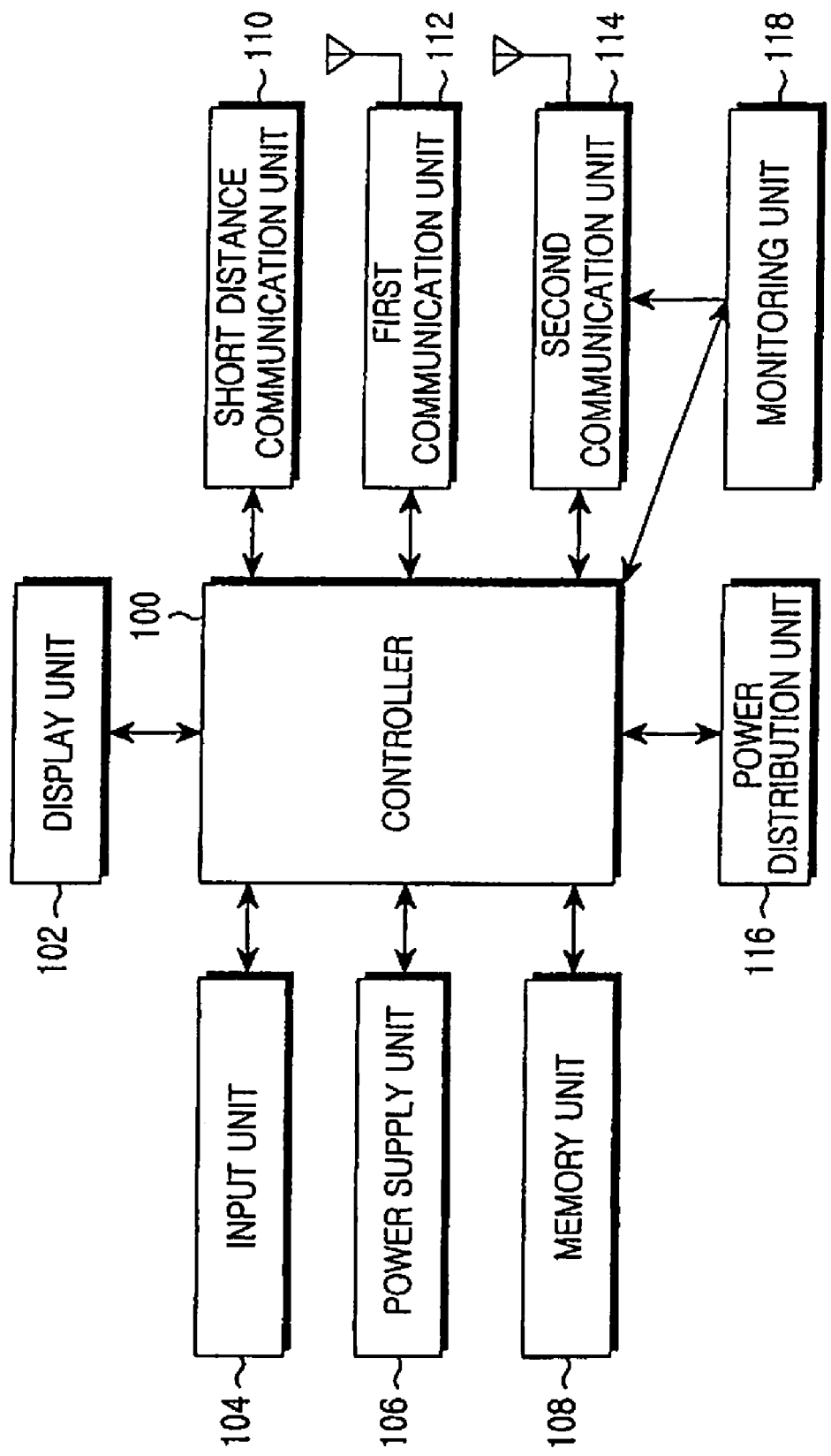
FIG. 1 is a block diagram of a mobile terminal for current distribution when a current amount that is greater than a suppliable current capacity is required in the mobile terminal according to the present invention.

FIG. 1 is a block diagram of a DBDM terminal for current distribution according to an embodiment of the present invention when a current amount that is greater than a suppliable current capacity is required in the DBDM terminal. In FIG. 1, the DBDM terminal includes a controller 100, a display unit 102, an input unit 104, a power supply unit 106, a memory unit 108, a short-distance communication unit 110, a first communication unit 112, a second communication unit 114, a power distribution unit 116, and a monitoring unit 118.

The display unit 102 displays state information (or indicator) generated during the operation of the DBDM terminal, numerals/characters, a moving picture, a still picture and so on and may use a color liquid crystal display device. In addition, the display unit 102 may operate in a low current consumption mode, in which the output of a backlight unit is a minimum output corresponding to minimum brightness in accordance with a current supply method of the power distribution unit 116 according to the present invention.

The input unit 104 receives a user's input from a keypad or a touch screen. In addition, the input unit 104 may stop driving the backlight unit of the keypad in accordance with the current supply policy of the power distribution unit 116.

The power supply unit 106 acting as a battery supplying current, under the control of the power distribution unit 116, supplies power to all components of the DBDM terminal that need power.

The memory unit 108 stores a program for controlling the whole operation of the DBDM terminal, application programs, data (such as phone numbers, SMS messages, compressed image files, moving pictures, and so on), and a current distribution table according to the present invention. The current distribution table stores information about the amount of current to be supplied to respective components of the DBDM terminal based on a total current amount that the DBDM terminal currently requires (i.e., a total required current amount). The current amounts to be supplied to the respective components based on the total required current amount is previously established through experimentation according to the priority order predetermined by a user and a communication provider. Moreover, the current distribution table includes a table with information about a remained current amount in the power supply unit 106 and another table with information about the current amounts to be supplied to the respective components such that current distribution may be performed in consideration of the state of the power supply unit 106.

The short-distance communication unit 110 transmits/receives data using short-distance wireless technology such as, for example, Bluetooth® technology, or Wireless Local Area Network (WLAN) technology.

The first communication unit 112 down-converts the radio frequency signal received through an antenna and performs dispreading and channel decoding for the received radio frequency signal. On the other hand, the first communication unit 112 performs spreading and channel coding for data, up-converts the data signal, and transmits the up-converted data signal through an antenna for communication using a first communication network. For the explanation of the present invention, the first communication unit 112 is assumed to have a high priority order.

The second communication unit 114, at the receipt of a radio frequency signal, down-converts the radio frequency signal received through an antenna and performs dispreading and channel decoding for the received Radio Frequency (RF) signal. On the other hand, the first communication unit 112, at the transmission of data, performs spreading and channel coding for data signal, up-converts the data signal and transmits the up-converted data signal through an antenna for communication using a second communication network different from the first communication network. In addition, when receiving a current limiting signal from the monitoring unit 118 according to the present invention, the second communication unit 114 performing communication decreases transmission power to a pre-established level to reduce a current amount consumed therein. Thereafter, the power distribution unit 116 controls the second communication unit 114 to readjust the transmission power (i.e., a current amount to be used) in accordance with a supplied current amount.

The first communication unit 112 and the second communication unit 114 perform communication in different communication modes. The communication modes include Code Division Multiple Access (CDMA), Wideband Code Division Multiple Access (WCDMA), and wideband wireless communication. For the explanation of the present invention, the first communication unit 112 performs the CDMA communication having high priority order and the second communication unit 114 performs the wideband wireless communication having a lower priority order than that of the CDMA communication.

The monitoring unit 118 detects in real time the total required current amount that is the sum of the current amounts required by the respective components of the DBDM terminal. When the total required current amount is greater than a limit threshold value, the monitoring unit 118 transmits the current limiting signal to the second communication unit 114 through a hardware (H/W) control path and notifies the power distribution unit 116. On the other hand, when the total required current amount is lower than a lift threshold value during a period when the power distribution unit 116 restricts a supply current amount, the monitoring unit 118 notifies the power distribution unit 116.

The total required current amount to be measured in the monitoring unit 118 is the sum of the respective current amounts needed for driving various components such as a backlight unit, a vibration motor, and a luminescent lamp included in the DBDM terminal and the communication function under a strong electric field or weak electric field area.

When detecting through the monitoring unit 118 that the total required current amount is greater than the limit threshold value, the power distribution unit 116 determines with reference to the current distribution table supply current amounts for the respective components according to a current supply policy corresponding to the total required current amount measured in the monitoring unit 118, and controls supply current amounts for the respective components according to the current supply method. At this time, the current supply to some of the respective components having a low priority order may be interrupted. Such components may include a backlight unit of a keypad that does not affect communication. In addition, under the control of the power distribution unit 116, the display unit 102 may be supplied with a current amount equal to the output of the backlight unit corresponding to minimum brightness in order to reduce current consumption. Moreover, according to the current supply method, the power distribution unit 116 readjusts to the optimum level so as not to affect the current supply to the first communication unit 112 a current amount to be supplied to the second communication unit 114 that consumes a minimum current amount according to the current limiting signal of the monitoring unit 118.

On the other hand, when detecting through the monitoring unit 118 that the total required current amount is lower than the lift threshold value during the restriction of a supply current amount according to the current supply policy, the power distribution unit 116 increases the current supply limits on the respective components and controls the supply current amounts required by the respective components.

The controller 100 controls the power distribution unit 116 and the monitoring unit 118. That is, the controller 100 may perform the functions of the power distribution unit 116 and the monitoring unit 118. Although separate units are provided for the respective functions of the controller 100 in order to describe the functions separately, the controller 100 may be designed to perform all or some of the functions of the power distribution unit 116 and the monitoring unit 118.

A current amount to be supplied to the second communication unit 114 is primarily controlled by the monitoring unit 118 through the H/W control path when the total required current amount is greater than the limit threshold value, and is secondarily controlled by the power distribution unit 116 through a software control path according to a suppliable current amount.

When the first communication unit 112 starts communication connection during the communication of the second communication unit 114, the total required current amount generally is greater than the limit threshold value. Accordingly, the control process of the current amount to be supplied to the second communication unit 114 is divided into two steps in order to provide stable current supply to the first communication unit 112 having a high priority order by quickly and primarily reducing, through the H/W control path, a current amount consumed in the second communication unit 114.

General Purpose Input/Output (GPIO) may be used as the H/W control path. In addition, Inter Process Communication (IPC) may be used as the software control path.

Figure 2:
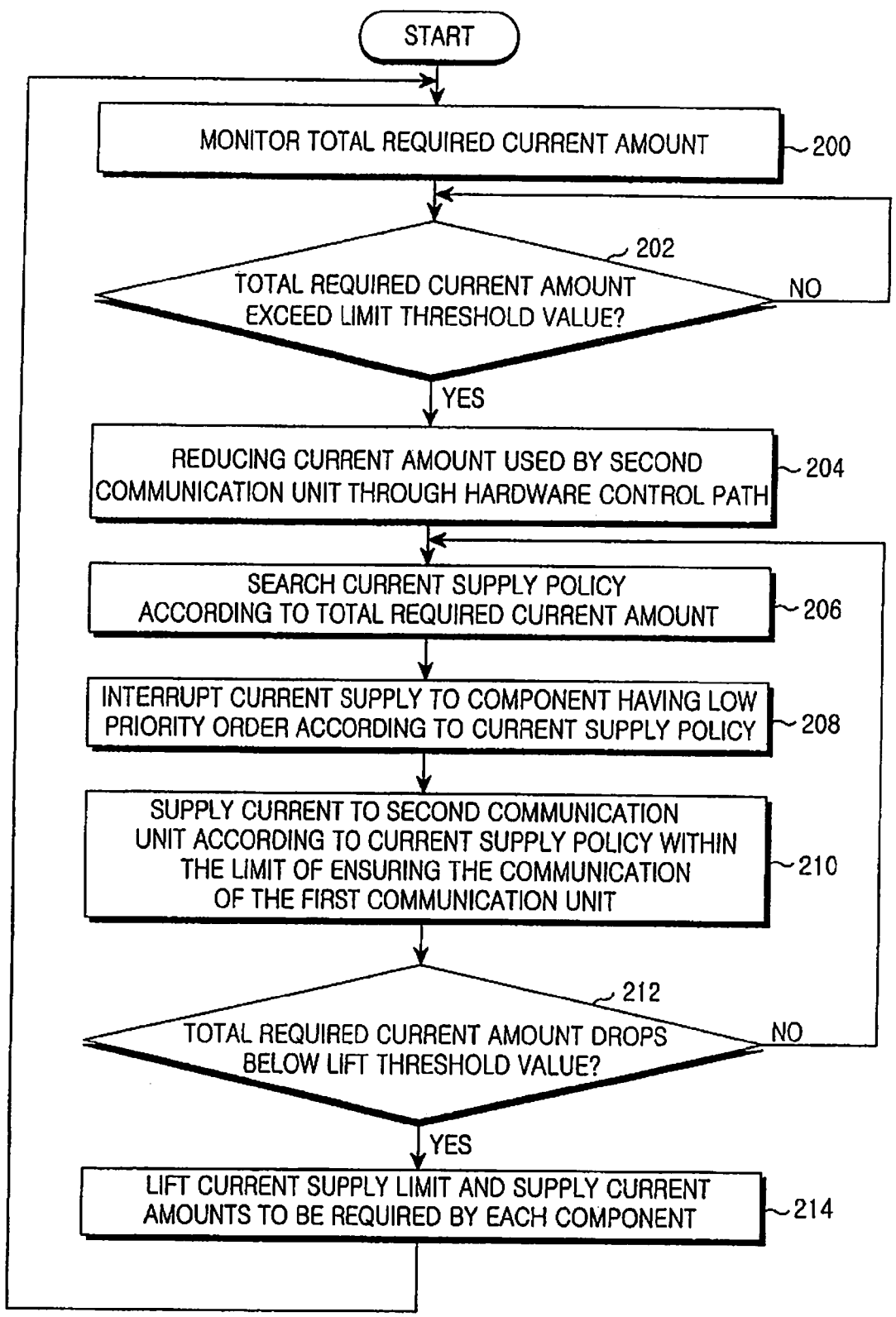
FIG. 2 is a flowchart illustrating a process for current distribution in a mobile terminal when a current amount that is greater than a suppliable current capacity is required in the mobile terminal according to the present invention.

A method for current control in a DBDM terminal according to the present invention will be described below with reference to the accompanying drawing. FIG. 2 is a flowchart illustrating a process for current distribution in a DBDM terminal according to the present invention when a current amount that is greater than a suppliable current capacity is required in the DBDM terminal.

In FIG. 2, in step 200, the DBDM terminal according to the present invention monitors current amounts required by respective components of the DBDM terminal. In step 202, whether a total required current amount is greater than a limit threshold value is determined. If the total required current amount is greater than the limit threshold value, in step 204, a current amount supplied to a second communication unit having a low priority order is reduced to a minimum level through a H/W control path. In step 206, a current supply method corresponding to the total required current amount is searched from a current distribution table.

Thereafter, in step 208, current supply to some of the respective components having a relatively low priority order is interrupted according to the searched current supply policy. In step 210, the second communication unit 114 is supplied with current according to the searched current supply policy within the limit of ensuring the communication of the first communication unit 112. In step 212, whether the total required current amount is lower than a lift threshold value is determined. When the total required current amount is greater than the lift threshold value, the process returns to step 206.

On the other hand, when the total required current amount is lower than the lift threshold value, the current supply limits on the respective components are raised and the current amounts required by the respective components are supplied to the respective components.

As described above, the present invention provides an apparatus and method for current control in the DBDM terminal, and in particular, to the current control apparatus and method for supplying current in different amounts according to a priority order when a current amount that is greater than the suppliable current capacity is required in the DBDM terminal, thereby preventing the communication function of the communication unit having a high priority order from being interrupted.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for current control in a mobile terminal, the apparatus comprising:
 a first communication unit for providing communication with a first communication network;
 a second communication unit for providing communication with a second communication network having a lower priority order than that of the first communication network;
 a power supply unit for supplying current;
 a monitoring unit for measuring a total required current amount, detecting whether the total required current amount is greater than a limit threshold value, and controlling a current amount to be consumed in the second communication unit to be reduced through a hardware control path when the total required current amount is greater than the limit threshold value;
 a memory unit for storing a current distribution table with information about supply current amounts for respective components of the mobile terminal, the supply current amounts for the respective components corresponding to the total required current amount; and
 a power distribution unit for searching the supply current amounts using the current distribution table when detecting through the monitoring unit that the total required current amount is greater than the limit threshold value, and controlling the power supply unit to supply current to the respective components according to the searched supply current amounts,
 wherein the power distribution unit controls interruption of supplying current to some of the respective components that do not affect the communication function of the first communication unit according to the result of searching the current distribution table.

2. The apparatus of claim 1, wherein the total required current amount measured in the monitoring unit is the sum of current amounts required by the respective components of the mobile terminal.

3. The apparatus of claim 1, wherein the power distribution unit controls readjustment of the current amount of the second communication unit according to the current distribution table, the current amount of the second communication unit being restricted by the monitoring unit through the hardware control path.

4. The apparatus of claim 3, wherein the power distribution unit controls readjustment of the current amount of the second communication unit according to the result of searching the current distribution table within the limit of ensuring the communication function of the first communication unit.

5. The apparatus of claim 1, wherein the hardware control path is a General Purpose Input/Output (GPIO).

6. An apparatus for current control in a mobile terminal, the apparatus comprising:
 a first communication unit for providing communication with a first communication network;
 a second communication unit for providing communication with a second communication network having a lower priority order than that of the first communication network;
 a power supply unit for supplying current;
 a monitoring unit for measuring a total required current amount, detecting whether the total required current amount is greater than a limit threshold value, and controlling a current amount to be consumed in the second communication unit to be reduced through a hardware control path when the total required current amount is greater than the limit threshold value;
 a memory unit for storing a current distribution table with information about supply current amounts for respective components of the mobile terminal, the supply current amounts for the respective components corresponding to the total required current amount; and
 a power distribution unit for searching the supply current amounts using the current distribution table when detecting through the monitoring unit that the total required current amount is greater than the limit threshold value, and controlling the power supply unit to supply current to the respective components according to the searched supply current amounts,
 wherein the monitoring unit detects that the total required current amount is greater than the limit threshold value and then detects whether the total required current amount is lower than the limit threshold value, and the power distribution unit controls the increase of the current amount limit using the current distribution table when detecting that the total required current amount is lower than the limit threshold value through the monitoring unit.

7. An apparatus for current control in a mobile terminal, the apparatus comprising:
 a power supply unit for supplying current;
 a memory unit for storing a current distribution table with information about supply current amounts for respective components of the mobile terminal, the supply current amounts for the respective components corresponding to a total required current amount;
 a monitoring unit for measuring the total required current amount that is the sum of current amounts required by the respective components of the mobile terminal, and detecting whether the total required current amount is greater than a limit threshold value; and
 a power distribution unit for searching the supply current amounts using the current distribution table when detecting through the monitoring unit that the total required current amount is greater than the limit threshold value, and controlling the power supply unit to supply current to the respective components according to the searched supply current amounts,
 wherein the monitoring unit detects that the total required current amount is greater than the limit threshold value and then detects whether the total required current amount is lower than the limit threshold value, and the power distribution unit controls the increase of the current amount limit using the current distribution table when detecting that the total required current amount is lower than the limit threshold value through the monitoring unit.

8. A method for current control in a mobile terminal, the method comprising the steps of:
 measuring a total required current amount that is the sum of the current amounts required by respective components of the mobile terminal;
 detecting whether the total required current amount is greater than a limit threshold value;
 searching supply current amounts for the respective components corresponding to the total required current amount using a current distribution table when the total required current amount is greater than the limit threshold value; and
 supplying current to the respective components according to the searched supply current amounts, wherein the current distribution table has information about the supply current amounts for the respective components of the mobile terminal, the supply current amounts for the respective components corresponding to the total required current amount, and wherein, before searching the supply current amounts for the respective components, detecting whether both of two communication units of the mobile terminal perform a communication function and controlling reduction of a current amount consumed in one of the two communication units having a lower priority order through a hardware control path when both of the two communication units perform a communication function.

9. The method of claim 8, wherein the hardware control path is General Purpose Input/Output (GPIO).

10. The method of claim 8, further comprising, after searching the supply current amounts for the respective components, readjusting a current amount of the communication unit having a lower priority order to a value searched from the current distribution table.

11. The method of claim 10, wherein readjusting the current amount of the communication unit comprises readjusting the current amount of the communication unit within the limit of ensuring the communication function of the communication unit having a higher priority order.

12. A method for current control in a mobile terminal, the method comprising the steps of:

measuring a total required current amount that is the sum of the current amounts required by respective components of the mobile terminal;

detecting whether the total required current amount is greater than a limit threshold value;

searching supply current amounts for the respective components corresponding to the total required current amount using a current distribution table when the total required current amount is greater than the limit threshold value; and supplying current to the respective components according to the searched supply current amounts;

detecting whether the total required current amount is lower than a lift threshold value; and lifting the current amount limit when the total required current amount is lower than the lift threshold value.

13. An apparatus for current control in a mobile terminal, the apparatus comprising:

a first communication unit for providing communication with a first communication network;

a second communication unit for providing communication with a second communication network having a lower priority order than that of the first communication network; and a monitoring unit for measuring a total required current amount, detecting whether the total required current amount is greater than a limit threshold value, and controlling a current amount in the second communication unit when the total required current amount is greater than the limit threshold value, wherein current is supplied to respective components according to searched supply current amounts corresponding to total required current amount using a current distribution table, wherein the power distribution unit controls interruption of supplying current to some of the respective components that do not affect the communication function of the first communication unit according to the searched supply current amounts corresponding to the total required current amount using the current distribution table.

14. An apparatus for current control in a mobile terminal, the apparatus comprising:

a monitoring unit for measuring a total required current amount that is the sum of current amounts required by respective components of the mobile terminal, and detecting whether the total required current amount is greater than a limit threshold value; and a power distribution unit for controlling the power supply unit to supply current to the respective components according to supply current amounts searched using a current distribution table when the total required current amount is greater than the limit threshold value, and supplying current to the respective components according to the searched supply current amounts, wherein the current distribution table has information about the supply current amounts for the respective components of the mobile terminal, the supply current amounts for the respective components corresponding to the total required current amount, and wherein, before searching the supply current amounts for the respective components, detecting whether both of two communication units of the mobile terminal perform a communication function and controlling reduction of a current amount consumed in one of the two communication units having a lower priority order through a hardware control path when both of the two communication units perform a communication function.

* * * * *